(12) United States Patent
Wang et al.

(10) Patent No.: US 12,228,139 B2
(45) Date of Patent: Feb. 18, 2025

(54) TWO-STAGE CAVITATION GENERATOR FOR ORGANIC WASTEWATER TREATMENT

(71) Applicant: Jiangsu University, Jiangsu (CN)

(72) Inventors: Yong Wang, Jiangsu (CN); Ming Li, Jiangsu (CN); Zhiyao Ding, Jiangsu (CN); Qin Pi, Jiangsu (CN); Qiang Xu, Jiangsu (CN); Yu Hu, Jiangsu (CN); Yu Huang, Jiangsu (CN); Houlin Liu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/564,101

(22) PCT Filed: Jun. 19, 2023

(86) PCT No.: PCT/CN2023/101008
§ 371 (c)(1),
(2) Date: Nov. 27, 2023

(87) PCT Pub. No.: WO2023/222140
PCT Pub. Date: Nov. 23, 2023

(65) Prior Publication Data
US 2024/0218883 A1    Jul. 4, 2024

(30) Foreign Application Priority Data
May 16, 2022    (CN) .......................... 202210529935.3

(51) Int. Cl.
F04D 29/22    (2006.01)
F04D 1/04    (2006.01)

(52) U.S. Cl.
CPC ........... *F04D 29/2216* (2013.01); *F04D 1/04* (2013.01); *F04D 29/2272* (2013.01)

(58) Field of Classification Search
CPC .... F04D 1/04; F04D 29/2216; F04D 29/2238; F04D 29/2255; F04D 29/2272;
(Continued)

(56) References Cited

U.S. PATENT DOCUMENTS 4,681,508 A * 7/1987 Kim .................... F04D 29/2238
416/185
5,897,062 A    4/1999 Enomoto et al.

FOREIGN PATENT DOCUMENTS

| CN | 113304690 | 8/2021 |
| CN | 114029015 | 2/2022 |

(Continued)

OTHER PUBLICATIONS

"International Search Report (Form PCT/ISA/210) of PCT/CN2023/101008," mailed on Sep. 16, 2023, with English translation thereof, pp. 1-4.

*Primary Examiner* — David E Sosnowski
*Assistant Examiner* — Jason G Davis
(74) *Attorney, Agent, or Firm* — JCIPRNET

(57) ABSTRACT

The present disclosure provides a two-stage cavitation generator for organic wastewater treatment, including a shrouded impeller, a stator, and a rotor. The shrouded impeller includes a front cover plate, blades, and a rear cover plate. Several blades are evenly distributed between the front cover plate and the rear cover plate. A working surface of the blade is an arc surface, and a back of the blade protrudes locally, so that a flow channel between the back of the blade and a working surface of its adjacent blade is narrowed locally, forming a throat structure. An outlet of the shrouded impeller is provided with the stator and the rotor, and the stator is located at an outer edge of the front cover plate and fixed on an inner wall of a volute. The rotor is mounted on the rear cover plate.

8 Claims, 5 Drawing Sheets

(58) Field of Classification Search
CPC .. F04D 29/242; F04D 29/245; F04D 29/4293; F04D 29/445
See application file for complete search history.

(56) References Cited

FOREIGN PATENT DOCUMENTS

| | | |
|---|---|---|
| CN | 114349110 | 4/2022 |
| CN | 114804290 | 7/2022 |
| WO | 2021126067 | 6/2021 |

* cited by examiner

TWO-STAGE CAVITATION GENERATOR FOR ORGANIC WASTEWATER TREATMENT

CROSS-REFERENCE TO RELATED APPLICATION

This application is a 371 of international application of PCT application serial no. PCT/CN2023/101008, filed on Jun. 19, 2023, which claims the priority benefit of China application serial no. 202210529935.3, filed on May 16, 2022. The entirety of the above-mentioned patent application is hereby incorporated by reference herein and made a part of this specification.

TECHNICAL FIELD

The present disclosure relates to the field of organic wastewater treatment, and in particular, to a two-stage cavitation generator for organic wastewater treatment.

BACKGROUND

In the new century, surface water and groundwater pollution has become a global environmental issue of high concern. The continuous development of human society has led to an exponential growth in demand for industrial, agricultural, and domestic water, and the problem of water resource scarcity has become more prominent. The current wastewater is complex in composition, not only containing conventional organic compounds, heavy metals, bacteria, and the like, but also containing artificially synthesized substances that are difficult to degrade. Organic wastewater is a major category of the current wastewater, and effective treatment and even secondary utilization of this type of wastewater are important measures for solving the problem of wastewater resource scarcity at present. However, traditional wastewater treatment methods often have low treatment efficiency, poor effectiveness, and are prone to cause secondary pollution. Therefore, new and environmentally friendly wastewater treatment methods have been explored in related work, and the potential of hydrodynamic cavitation technology has gradually been discovered.

Cavitation refers to a series of processes in which gas nuclei in a liquid undergo explosive growth, development, and collapse when a local pressure of the liquid drops to a saturated vapor pressure. Cavitation bubble collapse is accompanied by the release of energy: Micro jet, shock wave, high temperature and high pressure, and the like. The series of extreme conditions may cause the cavitation bubble collapse tend to become a highly active region, and some physical and chemical changes that are difficult to occur become easier. In addition, the energy released by the cavitation bubble collapse can also lead to breaking of chemical bonds in water molecules, thus forming hydroxyl radicals ($\cdot OH$) with a strong oxidizing property, which are strong oxidizing groups second only to fluorine gas ($F_2$), and can promote the oxidation and damaging of organic matters. The hydrodynamic cavitation technology has gradually been applied in fields such as sterilization and algae removal, wastewater treatment, and industrial cleaning.

Orifice plates and Venturi tubes are first applied in practical production and life due to their simple structures and strong cavitation intensity. However, the problems of high pressure loss and high energy consumption are also very prominent. In addition, due to the principle of cavitation generation, their structures are difficult to expand, and therefore blockage is inevitable. These shortcomings make it difficult to apply orifice plates and Venturi tube type cavitation devices on a large scale. The emerging rotational cavitation devices have solved the shortcomings of the orifice plates and Venturi tubes to some extent, but their cavitation intensity is not satisfactory and their cavitation method is single, so that it is difficult to convert limited energy into more cavitation bubbles.

SUMMARY

In response to the shortcomings in the prior art, the present disclosure provides a two-stage cavitation generator for organic wastewater treatment, which can periodically generate two-stage cavitation in an environment of one atmospheric pressure, thereby significantly improving the cavitation intensity, and also having a certain conveying capacity, strong adaptability, and great value for treatment of organic wastewater.

The present disclosure achieves the above technical objectives through the following technical means.

A two-stage cavitation generator for organic wastewater treatment includes a shrouded impeller, a stator, and a rotor. The shrouded impeller includes a front cover plate, several blades, and a rear cover plate. The several blades are evenly distributed between the front cover plate and the rear cover plate. A working surface of each of the blades is an arc surface, and a back of each of the blades protrudes locally, so that a flow channel between the back of each of the blades and the working surface of an adjacent one of the blades is narrowed locally, forming a throat structure, for generating primary cavitation. An outlet of the shrouded impeller is provided with the stator and the rotor, and the stator is located at an outer edge of the front cover plate and fixed on an inner wall of a volute. The rotor is mounted on the rear cover plate, a gap is provided between the stator and the rotor, and blind holes are respectively provided on the stator and the rotor on both sides of the gap, for performing secondary cavitation.

Furthermore, a top of a protrusion on the back of each of the blades is an arc surface in an axial direction, with a radius of $R_3=0.1-0.3b$, where b is a width of the outlet of the shrouded impeller.

Furthermore, the throat structure is positioned at $\delta=R_1/R_2=0.45-0.75$, where $R_2$ is a linear distance from a center of the protrusion on the back of each of the blades to an axis of rotation in a radial plane of the shrouded impeller; and $R_1$ is a radius of the outlet of the shrouded impeller.

Furthermore, a width of the throat structure is $W_1=0.25-0.55b$, and the width $W_1$ of the throat structure is defined as a vertical distance from a tip of the protrusion on the back of each of the blades to the working surface of the adjacent one of the blades in the radial plane of the shrouded impeller.

Furthermore, a width of the gap formed between the stator and the rotor is $W_2=0.2-1.0b$, where b is the width of the outlet of the shrouded impeller.

Furthermore, the stator and the rotor on the both sides of the gap are each provided with an annular protrusion, an effective thickness of the annular protrusion in a radial direction is $H_2=0.9-1.2b$, and the several blind holes are evenly distributed on the annular protrusion in a circumferential direction.

Furthermore, the blind holes are each formed by smoothly connecting a cylindrical hole and a hemispherical hole, a height of the cylindrical hole is $H_1=0.1-0.4b$, and a radius of the hemispherical hole is $R_4=0.2-0.6b$.

Furthermore, a quantity of the blind holes is $Z_2=3\text{-}5Z_1$, where $Z_1$ is a quantity of the blades.

The advantages of the present disclosure lie in that:

1. The two-stage cavitation generator for organic wastewater treatment described in the present disclosure is driven by a motor without the need for an additional power device to provide a pressure for operation of the cavitation generator, which can degrade organic matters in wastewater while conveying the organic wastewater, thereby greatly reducing the process complexity.
2. With full consideration of practical application scenarios, the two-stage cavitation generator for organic wastewater treatment described in the present disclosure can avoid tedious rotational speed and pressure adjustments, and can generate cavitation of a certain intensity at a low rotational speed and one atmospheric pressure at the inlet, thereby reducing unnecessary operations and providing strong adaptability.
3. The two-stage cavitation generator for organic wastewater treatment described in the present disclosure generates primary cavitation downstream of the throat, cavitation bubbles then collapse to release energy, secondary cavitation is generated after the fluid reaches the narrow gap between the stator and the rotor, and cavitation bubbles collapse near outlets of the stator and the rotor to release energy again. The two stages of cavitation do not interfere with each other, thereby improving the cavitation intensity.
4. The two-stage cavitation generator for organic wastewater treatment described in the present disclosure can adjust the structure of the throat and the structure of the blind hole, and can also adapt to organic wastewater treatment in different scenarios by changing operating parameters, thereby having strong flexibility.

BRIEF DESCRIPTION OF THE DRAWINGS

In order to provide a clearer explanation of the embodiments of the present disclosure or the technical solutions in the prior art, a brief introduction will be given to the accompanying drawings required in the description of the embodiments or prior art. The accompanying drawings in the following description are some embodiments of the present disclosure. For those of ordinary skill in the art, it is evident that other accompanying drawings can be obtained according to these drawings without any creative efforts.

In the drawings.

Figure 1:
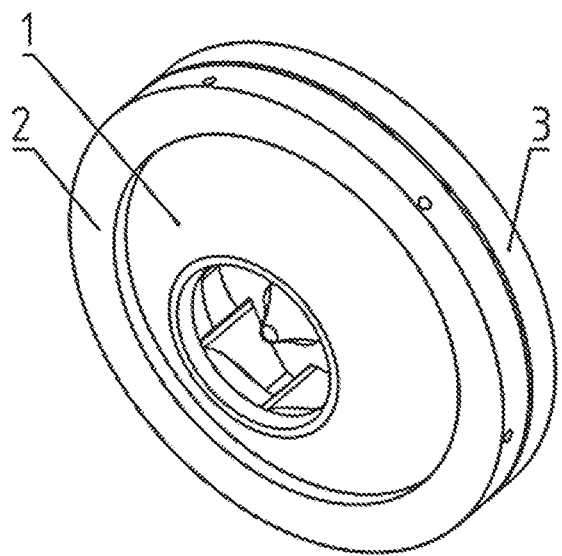
FIG. 1 is a schematic structural diagram of a two-stage cavitation generator according to the present disclosure.

1—Impeller; 2—Stator; 3—Rotor; 1a—Front cover plate; 1b—Blade; 1c—Rear cover plate; S—Throat; 2a—First blind hole; 3a—Second blind hole.

DETAILED DESCRIPTION OF THE EMBODIMENTS

The present disclosure will be further explained with reference to the accompanying drawings and specific embodiments, but the protection scope of the present disclosure is not limited to this.

The embodiments of the present disclosure are described in detail below, examples of the embodiments are shown in the accompanying drawings, where the same or similar reference numerals throughout represent the same or similar elements or elements with the same or similar functions. The embodiments described below with reference to the accompanying drawings are exemplary and intended to explain the present disclosure, but should not be understood as limiting the present disclosure.

In the description of the present disclosure, it should be understood that orientation or position relationships indicated by terms "center," "longitudinal." "transverse." "length," "width." "thickness." "up." "down." "axial," "radial," "vertical." "horizontal." "inner." "outer." and the like are based on orientation or position relationships shown in the accompanying drawings, only for the convenience of describing the present disclosure and simplifying the description, rather than indicating or implying that the apparatus or element referred to must have a specific orientation or be constructed and operated in a specific orientation, and therefore should not be understood as a limitation to the present disclosure. In addition, terms "first" and "second" are only used for the purpose of description and should not be understood as indicating or implying relative importance or implying the quantity of technical features indicated. Therefore, features limited by "first" and "second" may explicitly or implicitly include one or more of the features. In the description of the present disclosure. "a plurality of" means two or more, unless otherwise specifically defined.

In the present disclosure, unless otherwise clearly defined and limited, terms "mount," "connect." "connection." "fix." and other terms should be understood in a broad sense, for example, there may be a fixed connection, a detachable connection, or an integrated connection; there may be a mechanical connection or an electrical connection; there may be a direct connection, indirect connection through an intermediate medium, or an internal communication between two elements. For those of ordinary skill in the art, the specific meanings of the above terms in the present disclosure can be understood based on specific circumstances.

Figure 2:
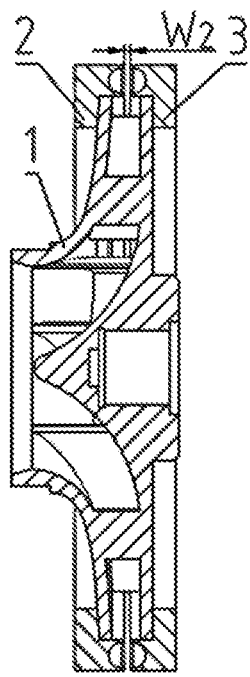
FIG. 2 is a cross-sectional diagram of a two-stage cavitation generator according to the present disclosure.
Figure 3:
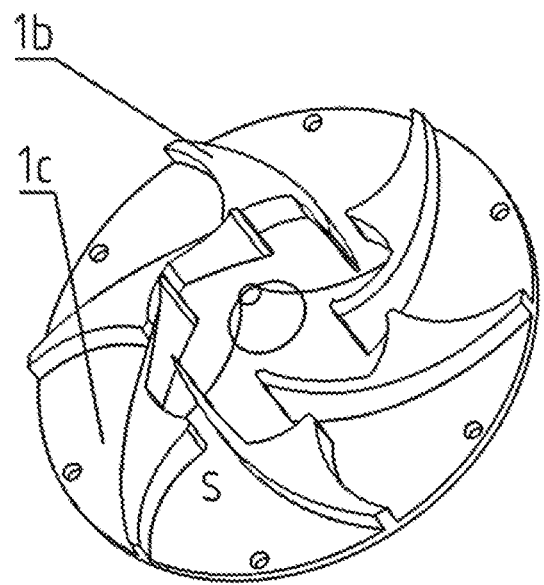
FIG. 3 is a three-dimensional diagram of a shrouded impeller of a two-stage cavitation generator according to the present disclosure, with a front cover plate being hidden in the figure.

As shown in FIG. 1. FIG. 2, and FIG. 3, a two-stage cavitation generator for organic wastewater treatment according to the present disclosure includes a shrouded impeller 1, a stator 2, and a rotor 3. The shrouded impeller 1 includes a front cover plate 1a, blades 1b, and a rear cover plate 1c. Six blades 1b are evenly distributed between the front cover plate 1a and the rear cover plate 1c. A working surface of the blade 1b is an arc surface, and a back of the blade 1b protrudes locally, so that a flow channel between the back of the blade 1b and a working surface of its adjacent blade 1b is narrowed locally, forming a throat structure s. A quantity of the throats s is n=6. An outlet of the shrouded impeller is provided with the stator 2 and the rotor 3. The stator 2 is located at an outer edge of the front cover plate 1a, and the stator 2 is fixed on an inner wall of a volute. The rotor 3 is mounted on the rear cover plate 1c, and a gap is provided between the stator 2 and the rotor 3. A first blind hole 2a and a second blind hole 3a are respectively provided on the stator 2 and the rotor 3 on both sides of the gap, for performing secondary cavitation.

Figure 6:
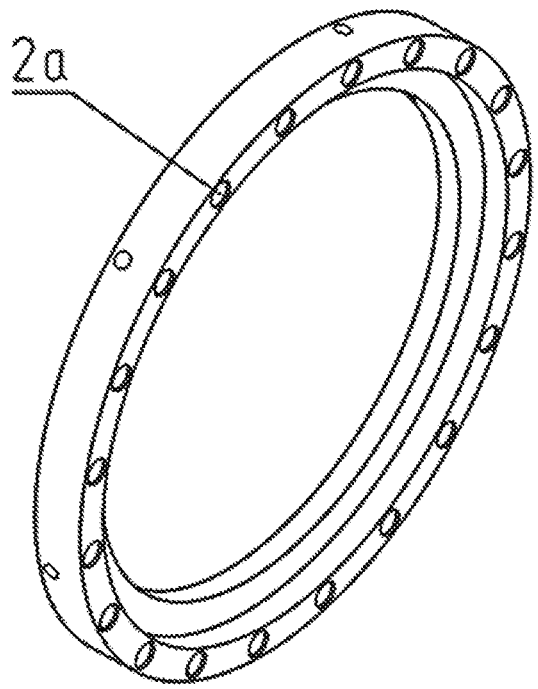
FIG. 6 is a three-dimensional diagram of a stator of a two-stage cavitation generator according to the present disclosure.
Figure 8:
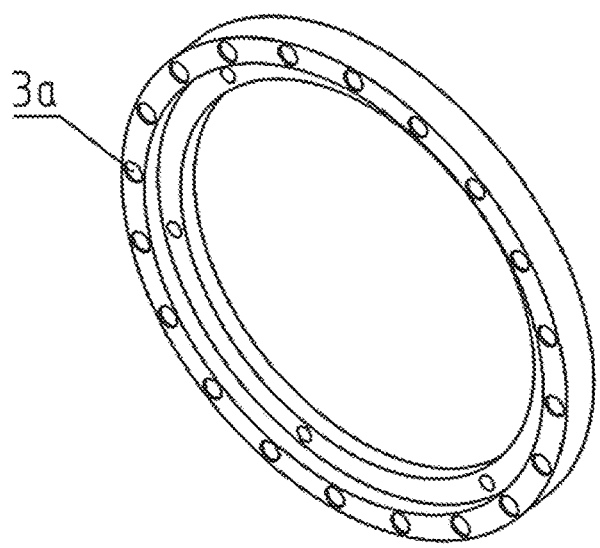
FIG. 8 is a three-dimensional diagram of a rotor of a two-stage cavitation generator according to the present disclosure.

As can be seen with reference to FIG. 2, FIG. 6, and FIG. 8, the stator 2 and rotor 3 are both circular rings with an L-shaped section. The L-shaped circular ring stator 2 is in clearance fit with the outer edge of the front cover plate 1a, and the L-shaped circular ring rotor 3 is mounted on the rear cover plate 1c. A gap is provided between the L-shaped circular ring stator 2 and the L-shaped circular ring rotor 3. A width of the gap is $W_2=0.2$-$1.0b$, where b is a width of the outlet of the shrouded impeller 1.

Figure 4:
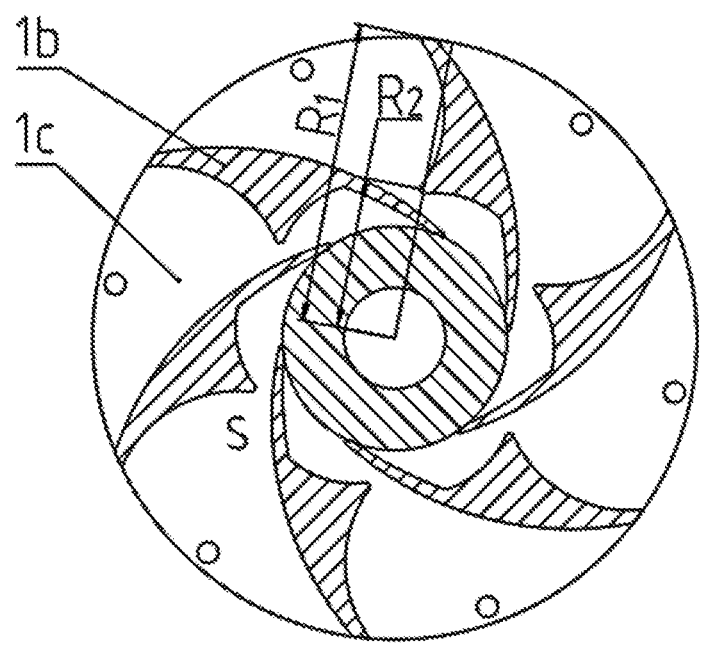
FIG. 4 is a cross-sectional diagram of a shrouded impeller of a two-stage cavitation generator according to the present disclosure.
Figure 5:
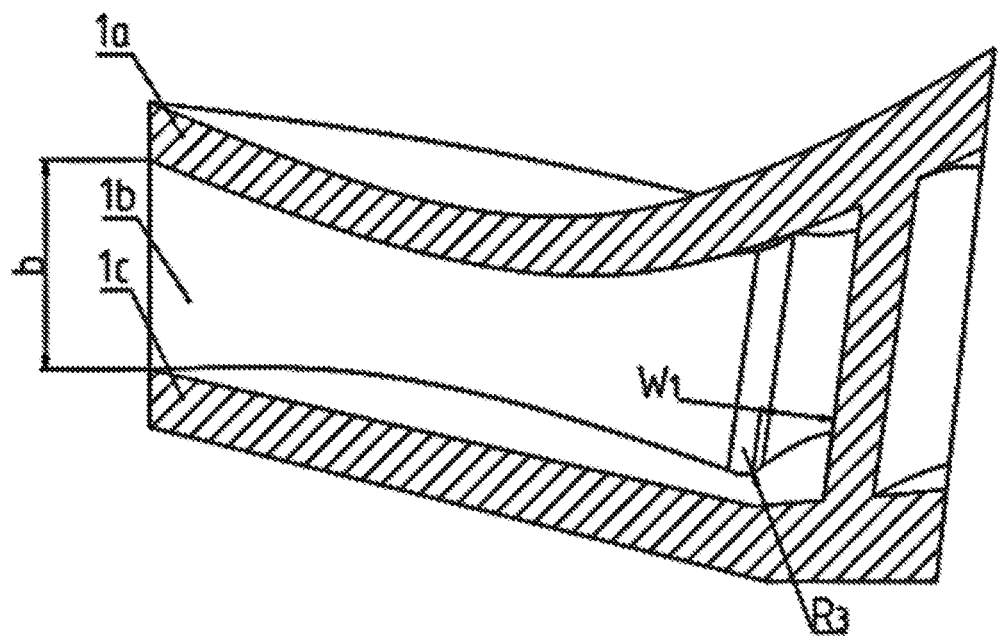
FIG. 5 is a detailed diagram of a throat of a two-stage cavitation generator according to the present disclosure.

As shown in FIG. 4 and FIG. 5, a top of the protrusion on the back of the blade 1b is an arc surface in an axial direction, with a radius of $R_3=0.1$-$0.3b$, where b is the width of the outlet of the shrouded impeller 1. The throat structure s is positioned at $\delta=R_1/R_2=0.45$-$0.75$, where $R_2$ is a linear distance from a center of the circular protrusion on the back of the blade 1b to an axis of rotation in a radial plane of the shrouded impeller 1; and $R_1$ is a radius of the outlet of the shrouded impeller 1. A width of the throat structure s $W_1=0.25$-$0.55b$, and the width $W_1$ of the throat structure s is defined as a vertical distance from a tip of the circular protrusion on the back of the blade 1b to the working surface of the adjacent blade 1b in the radial plane of the shrouded impeller 1.

Figure 7:
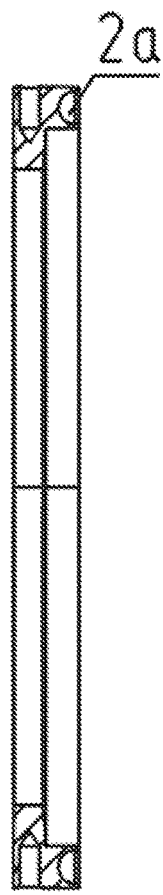
FIG. 7 is a cross-sectional diagram of a stator of a two-stage cavitation generator according to the present disclosure.
Figure 9:
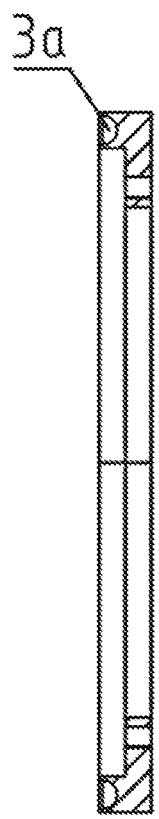
FIG. 9 is a cross-sectional diagram of a rotor of a two-stage cavitation generator according to the present disclosure.
Figure 10:
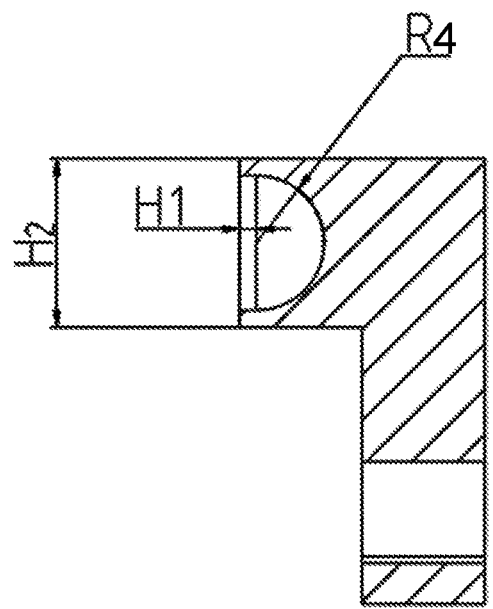
FIG. 10 is a detailed diagram of a blind hole of a two-stage cavitation generator according to the present disclosure.

As shown in FIG. 7 and FIG. 9, the stator 2 and the rotor 3 on both sides of the gap are each provided with an annular protrusion. An effective thickness of the annular protrusion in a radial direction is $H_2=0.9$-$1.2b$. The stator 2 has several first blind holes 2a evenly distributed on the annular protrusion in a circumferential direction. The rotor 3 has several second blind holes 3a evenly distributed on the annular protrusion in the circumferential direction. The structures of the first blind hole 2a and the second blind hole 3a are the same. Taking the first blind hole 2a as an example, as shown in FIG. 10, the first blind hole 2a is formed by smoothly connecting a cylindrical hole and a hemispherical hole. A height of the cylindrical hole is $H_1=0.1$-$0.4b$, and a radius of the hemispherical hole is $R_4=0.2$-$0.6b$. A quantity of the first blind holes 2a is $Z_2=3$-$5Z_1$, where $Z_1$ is a quantity of the blades 1b.

Working Principle:

As a fluid conveying apparatus, a pump ignores a depth of a buried pipe when used, and its inlet pressure is approximately one atmospheric pressure. At this time, cavitation is not expected to occur because it may affect a conveying efficiency. Therefore, in practical applications, the pump may basically not undergo cavitation at the inlet pressure of one atmospheric pressure. The two-stage cavitation generator according to the present disclosure is a modification of a traditional pump so as to utilize energy released by its cavitation collapse. By using specific cavitation generating units, such as blind holes and throat structures, a local pressure inside the cavitation generator may be reduced to below a saturated vapor pressure at the inlet pressure of one atmospheric pressure, thereby causing cavitation. This also avoids the pressure reduction operation required to achieve cavitation, and cavitation occurring at one atmospheric pressure is also a goal of the design. The two-stage cavitation generator provided by the present disclosure has three forms of cavitation, namely contraction cavitation, vortex cavitation, and shear cavitation. The impeller increases kinetic energy and pressure energy of a fluid by doing work on it, thereby conveying the fluid to a higher position. Before reaching the throat s, the fluid already has a certain velocity. When the fluid passes through the throat s, due to the reduction of a flow area, a fluid velocity increases sharply. As can be seen from the Bernoulli's principle, a downstream pressure of the throat drops suddenly, and when the pressure drops below the saturated vapor pressure, cavitation occurs. The process belongs to contraction cavitation, and the cavitation at this position is primary cavitation. Subsequently, due to the continued increase of the kinetic energy and pressure energy of the fluid by the blades, cavitation bubbles gradually collapse inside the impeller to release energy. When the fluid passes through the narrow gap between the stator and the rotor at the outlet of the impeller, the flow velocity is already high. The fluid enters the blind hole and then flows out, forming a vortex inside the blind hole. When a pressure at a center of the vortex drops below the saturated vapor pressure, cavitation occurs. In addition, due to periodic alignment and staggering of the blind holes between the stator and the rotor, the shear effect under the action may also lead to cavitation. Therefore, there are vortex cavitation and shear cavitation between the stator and the rotor, which belong to secondary cavitation. Subsequently, cavitation bubbles gradually collapse in a high-pressure region and releases energy again.

It should be understood that although this specification is described according to various embodiments, it does not necessarily include an independent technical solution for each embodiment. This description of the specification is only for clarity. Those skilled in the art should consider the specification as a whole, and the technical solutions in the various embodiments can also be appropriately combined to form other implementations understandable by those skilled in the art.

The series of detailed explanations listed above are only specific explanations for the feasible embodiments of the present disclosure, and are not intended to limit the scope of protection of the present disclosure. Any equivalent embodiments or modifications made without departing from the spirit of the present disclosure should be included in the scope of protection of the present disclosure.

What is claimed is:

1. A two-stage cavitation generator for organic wastewater treatment, comprising a shrouded impeller, a stator, and a rotor, wherein the shrouded impeller comprises a front cover plate, several blades, and a rear cover plate, the several blades are evenly distributed between the front cover plate and the rear cover plate, a working surface of each of the blades is an arc surface, and a back of each of the blades protrudes locally, so that a flow channel between the back of each of the blades and the working surface of an adjacent one of the blades is narrowed locally, forming a throat structure; an outlet of the shrouded impeller is provided with the stator and the rotor, and the stator is located at an outer edge of the front cover plate and fixed on an inner wall of a volute; the rotor is mounted on the rear cover plate, a gap is provided between the stator and the rotor, and blind holes are respectively provided on the stator and rotor on both sides of the gap, for performing secondary cavitation.

2. The two-stage cavitation generator for organic wastewater treatment according to claim 1, wherein a top of a protrusion on the back of each of the blades is an arc surface in an axial direction, with a radius of $0.1b \leq R_3 \leq 0.3b$, wherein b is a width of the outlet of the shrouded impeller.

3. The two-stage cavitation generator for organic wastewater treatment according to claim 1, wherein the throat structure is positioned at $\delta = R_1/R_2$ and $0.45 \leq \delta \leq 0.75$, wherein $R_2$ is a linear distance from a center of a protrusion on the back of each of the blades to an axis of rotation in a radial plane of the shrouded impeller; and $R_1$ is a radius of the outlet of the shrouded impeller, $\delta$ is a ratio of $R_1$ and $R_2$.

4. The two-stage cavitation generator for organic wastewater treatment according to claim 1, wherein a width of the throat structure is $0.25b \leq W_1 \leq 0.55b$, and the width $W_1$ of the throat structure is defined as a vertical distance from a tip of a protrusion on the back of each of the blades to the working surface of the adjacent one of the blades in the radial plane of the shrouded impeller, wherein b is a width of the outlet of the shrouded impeller.

5. The two-stage cavitation generator for organic wastewater treatment according to claim 1, wherein a width of the gap formed between the stator and the rotor is $0.2b \leq W_2 \leq 1.0b$, wherein b is the width of the outlet of the shrouded impeller.

6. The two-stage cavitation generator for organic wastewater treatment according to claim 1, wherein the stator and the rotor on the both sides of the gap are each provided with an annular protrusion, an effective thickness of the annular protrusion in a radial direction is $0.9b \leq H_2 \leq 1.2b$, and the several blind holes are evenly distributed on the annular protrusion in a circumferential direction, wherein b is a width of the outlet of the shrouded impeller.

7. The two-stage cavitation generator for organic wastewater treatment according to claim 6, wherein the blind holes are each formed by smoothly connecting a cylindrical hole and a hemispherical hole, a height of the cylindrical hole is $0.1b \leq H_1 \leq 0.4b$, and a radius of the hemispherical hole is $0.2b \leq R_4 \leq 0.6b$, wherein b is a width of the outlet of the shrouded impeller.

8. The two-stage cavitation generator for organic wastewater treatment according to claim 6, wherein a quantity of the blind holes is $3Z_1 \leq Z_2 \leq 5Z_1$, wherein $Z_1$ is a quantity of the blades.

* * * * *